(12) United States Patent
Maki et al.

(10) Patent No.: US 10,449,941 B2
(45) Date of Patent: Oct. 22, 2019

(54) BRAKING DEVICE FOR VEHICLE

(71) Applicant: ADVICS CO., LTD., Kariya-shi, Aichi-ken (JP)

(72) Inventors: Kazuya Maki, Nagoya (JP); Shintaro Osaki, Nissin (JP); Masaki Maruyama, Nagoya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 7 days.

(21) Appl. No.: 15/568,955

(22) PCT Filed: Apr. 21, 2016

(86) PCT No.: PCT/JP2016/062587
§ 371 (c)(1),
(2) Date: Oct. 24, 2017

(87) PCT Pub. No.: WO2016/175114
PCT Pub. Date: Nov. 3, 2016

(65) Prior Publication Data
US 2018/0118181 A1  May 3, 2018

(30) Foreign Application Priority Data
Apr. 28, 2015 (JP) .................... 2015-091765

(51) Int. Cl.
*B60T 13/14* (2006.01)
*B60T 8/00* (2006.01)
(Continued)

(52) U.S. Cl.
CPC ............ *B60T 13/146* (2013.01); *B60T 7/042* (2013.01); *B60T 8/00* (2013.01); *B60T 8/172* (2013.01);
(Continued)

(58) Field of Classification Search
CPC ...... B60T 7/042; B60T 8/3275; B60T 8/4081; B60T 8/4872; B60T 13/686
(Continued)

(56) References Cited

U.S. PATENT DOCUMENTS 6,293,633 B1 * 9/2001 Hara .................... B60T 8/17616
303/113.2
2003/0201669 A1 * 10/2003 Yokoyama .......... B60T 8/17616
303/113.4
(Continued)

FOREIGN PATENT DOCUMENTS

| JP | 2004-291772 A | 10/2004 |
| JP | 2004291772 A * | 10/2004 |
| JP | 2009-234407 A | 10/2009 |

OTHER PUBLICATIONS

Englished machined translation of JP-2004-291772, Oct. 21, 2004.*
(Continued)

*Primary Examiner* — Robert A. Siconolfi
*Assistant Examiner* — San M Aung
(74) *Attorney, Agent, or Firm* — Buchanan Ingersoll & Rooney PC

(57) ABSTRACT

Provided is a braking device for a vehicle comprising: a first hydraulic pressure generation unit which generates hydraulic pressure corresponding to the volume of a master chambers in the master chambers that change in volume according to the movement of master pistons; a second hydraulic pressure generation unit which is configured so as to be capable of generating a desired hydraulic pressure in a bottoming state in which the forward movement of the master pistons is restricted by a master cylinder; braking force generation units which apply the braking force corresponding to the input hydraulic pressure to wheels of a vehicle; and a braking force control unit which causes the second hydraulic pressure generation unit to generate hydraulic pressure in the bottoming state, and inputs the hydraulic pressure to the braking force generation units.

11 Claims, 5 Drawing Sheets

(51) Int. Cl.
  *B60T 8/1761*     (2006.01)
  *B60T 7/04*       (2006.01)
  *B60T 8/172*      (2006.01)
  *B60T 8/36*       (2006.01)
  *B60T 8/40*       (2006.01)
  *B60T 8/44*       (2006.01)
(52) U.S. Cl.
  CPC ............ *B60T 8/1761* (2013.01); *B60T 8/363* (2013.01); *B60T 8/4013* (2013.01); *B60T 8/4081* (2013.01); *B60T 8/442* (2013.01)
(58) Field of Classification Search
  USPC ...................................................... 303/113.4
  See application file for complete search history.

(56) References Cited

U.S. PATENT DOCUMENTS

2004/0189087 A1* 9/2004 Kusano .................. B60T 8/441
                                               303/155
2009/0212621 A1* 8/2009 Drott ........................ B60T 8/38
                                               303/14

OTHER PUBLICATIONS

International Search Report (PCT/ISA/210) dated Jun. 21, 2016, by the Japanese Patent Office as the International Searching Authority for International Application No. PCT/JP2016/062587.
Written Opinion (PCT/ISA/237) dated Jun. 21, 2016, by the Japanese Patent Office as the International Searching Authority for International Application No. PCT/JP2016/062587.

* cited by examiner

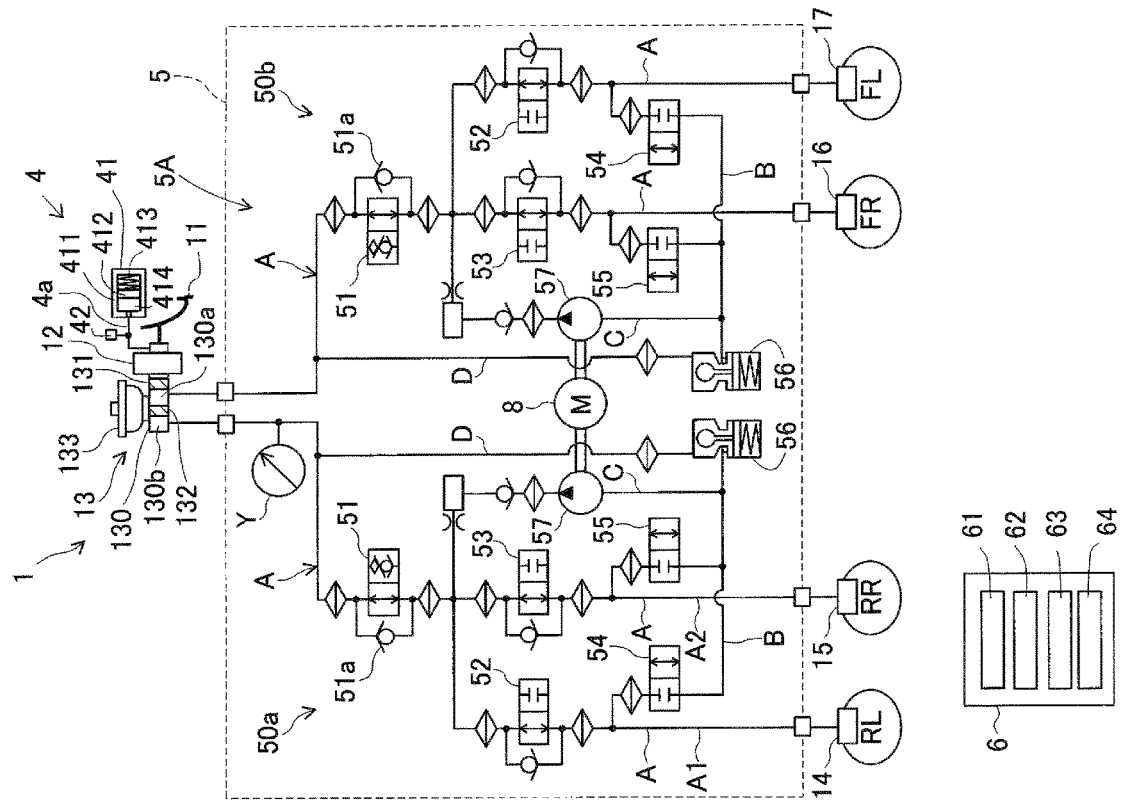
[FIG. 1]

[FIG. 2]
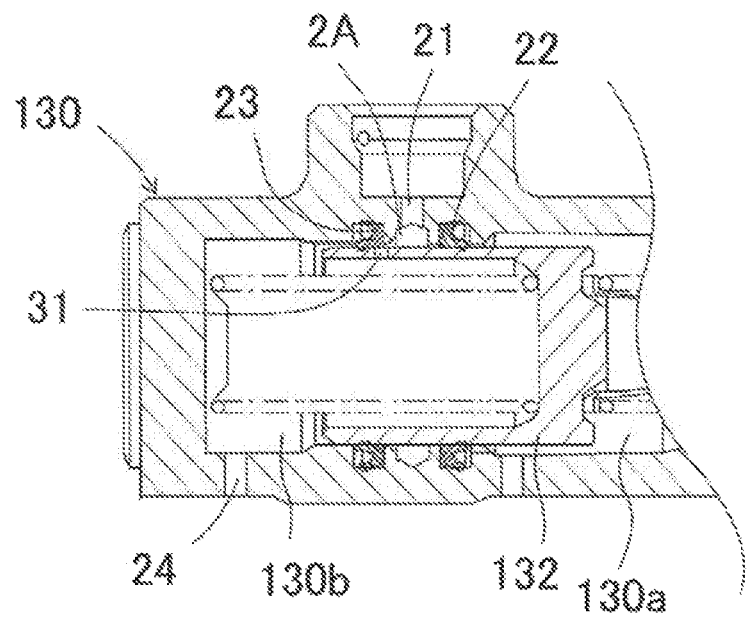
FORWARD MOVEMENT SIDE ←——→ BACKWARD MOVEMENT SIDE
[FIG. 3]
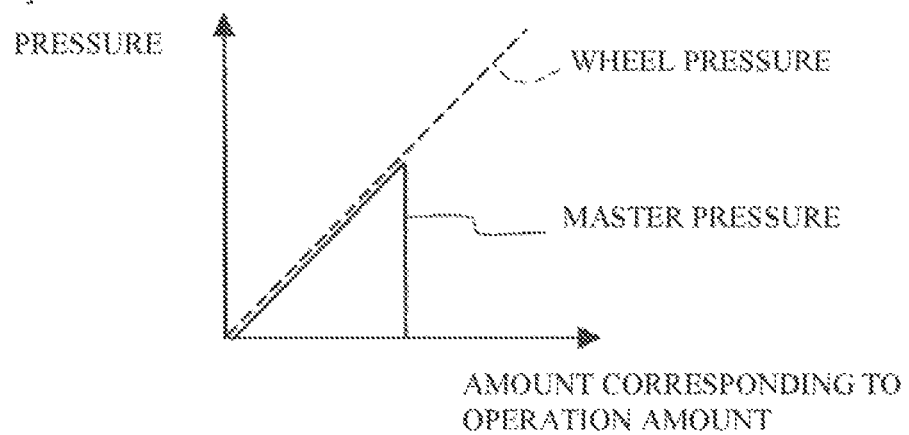

[FIG. 4]
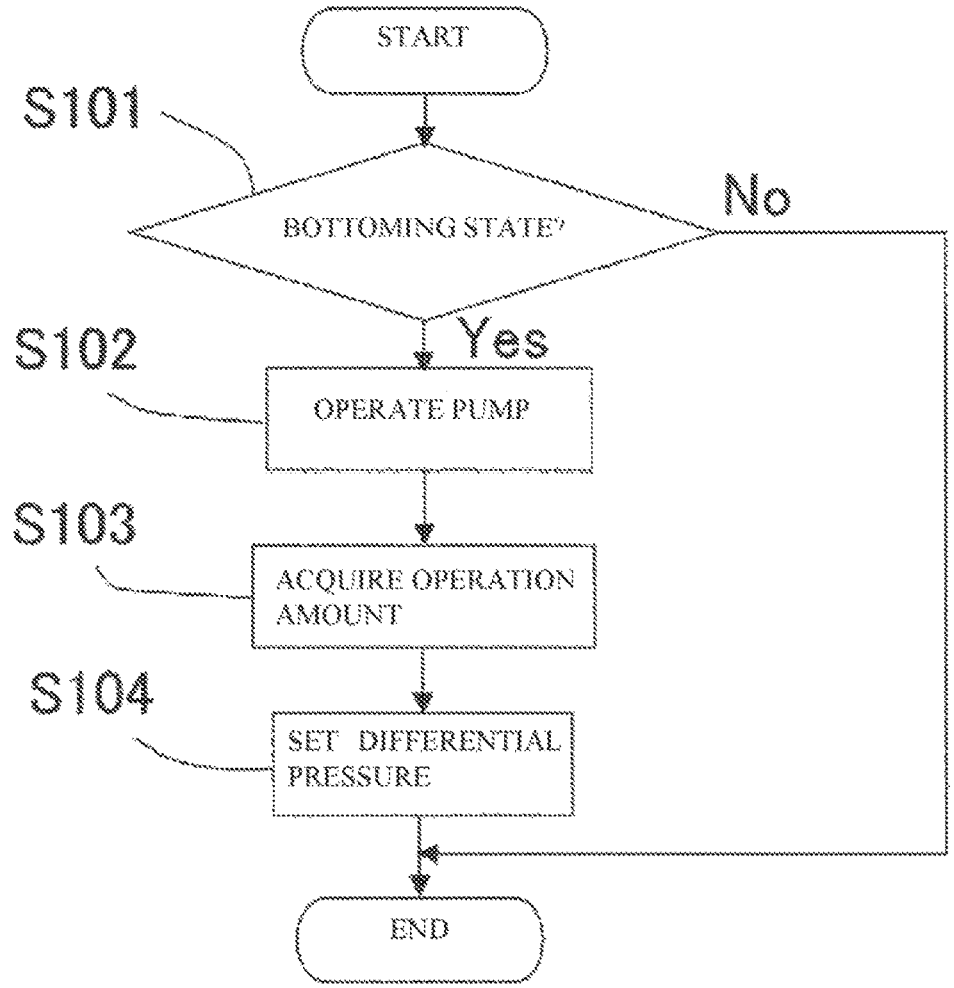
[FIG. 5]
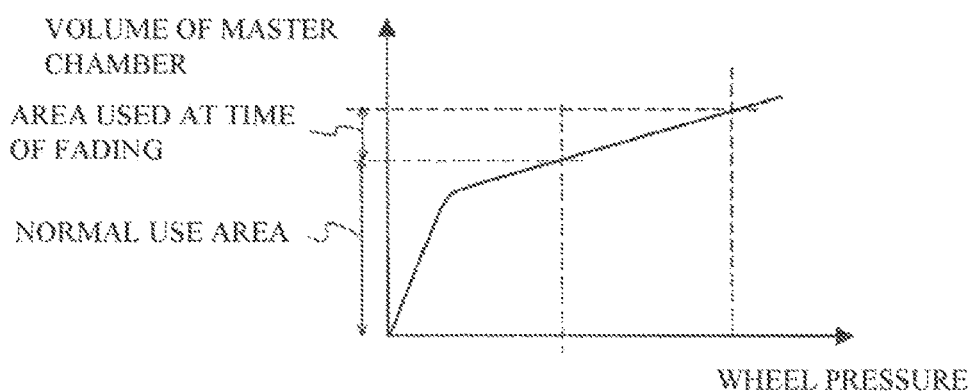

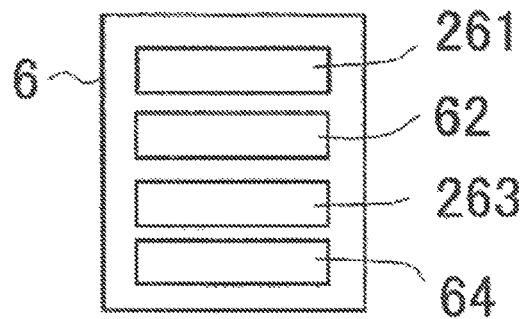
[FIG. 6]
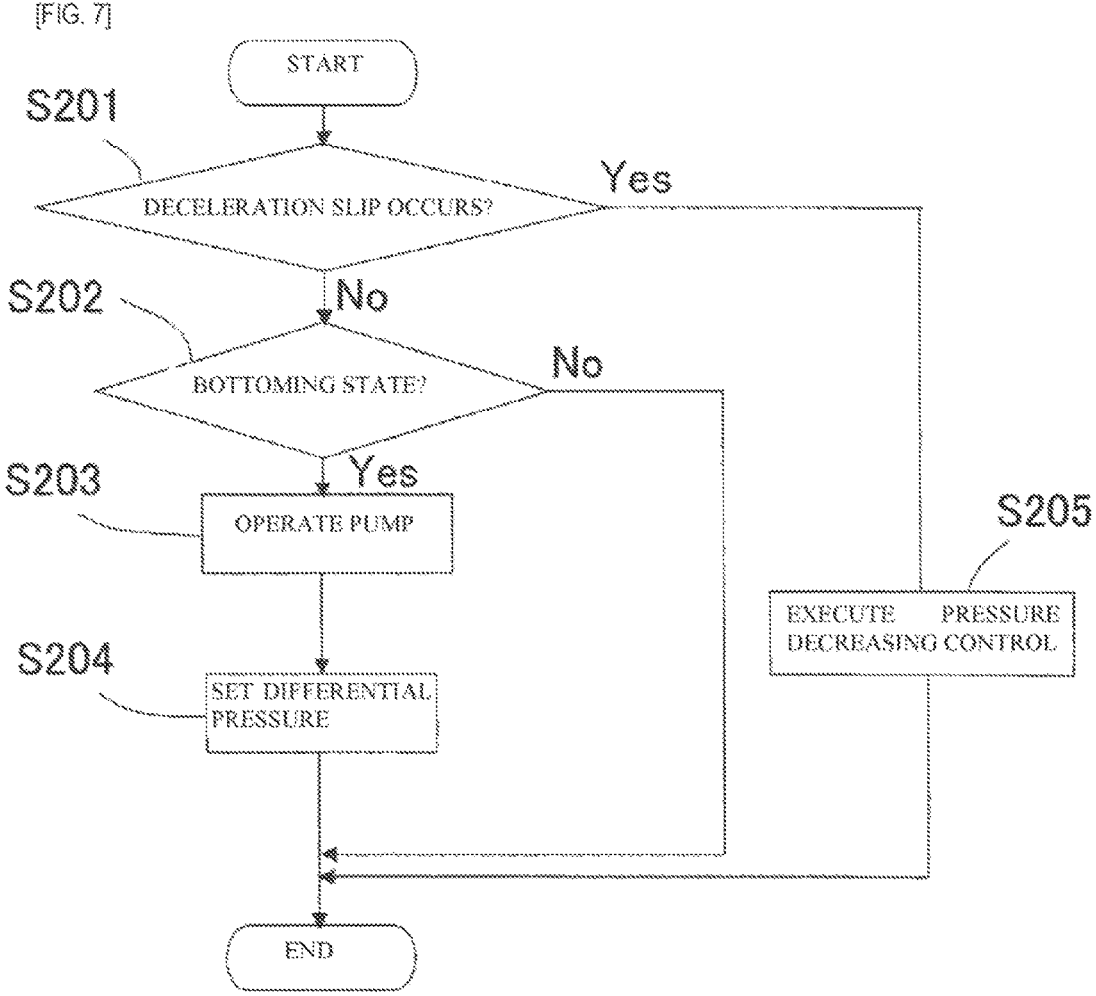
[FIG. 7]

[FIG. 8]
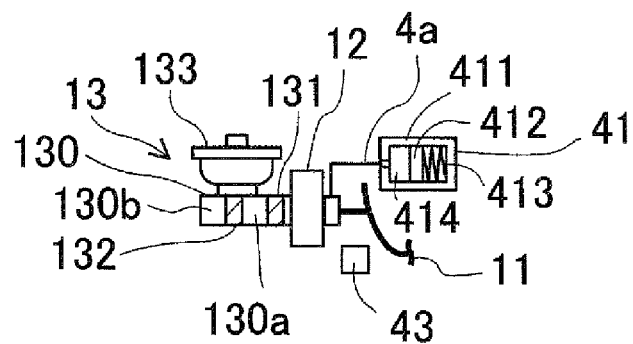
[FIG. 9]
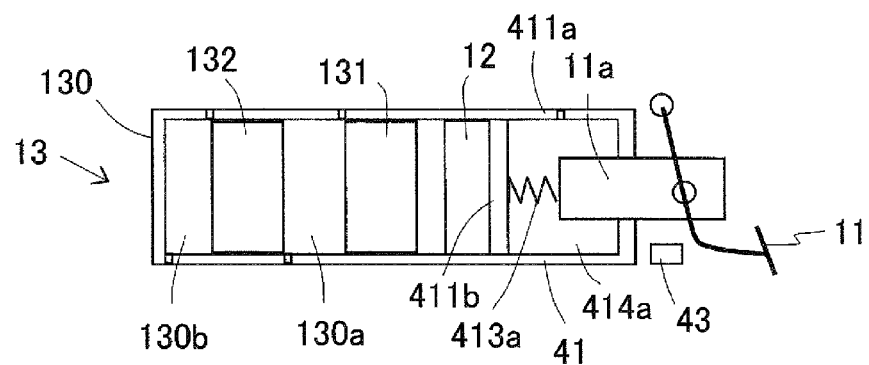
[FIG. 10]
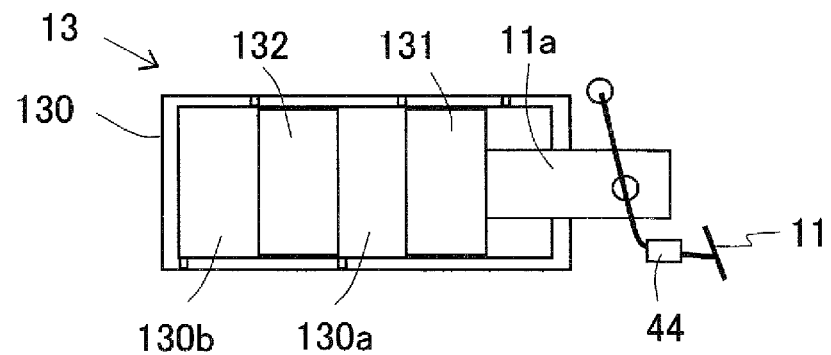

BRAKING DEVICE FOR VEHICLE

TECHNICAL FIELD

The present invention relates to a braking device for a vehicle.

BACKGROUND ART

For example, a braking device for a vehicle that uses brake assist control and the like to allow a wheel to exert braking force irrespective of brake operation has been developed. Such braking device for a vehicle is disclosed in, for example, JP 2009-234407 A. In this braking device for a vehicle, smooth transition to anti-lock brake system (ABS) control is possible by increasing a pressurizing amount to a wheel cylinder when a predetermined time elapses in brake assist control. According to this, a braking distance may be shortened.

CITATION LIST

Patent Literature

Patent Literature 1: JP 2009-234407 A

SUMMARY OF INVENTION

Technical Problems

However, in the above-described braking device for a vehicle, a basic configuration of a brake system, that is, a physical size of a master cylinder (and its weight associated therewith) is not taken into consideration at all. That is, the conventional braking device for a vehicle has a room for improvement in terms of the physical size of the master cylinder. Therefore, the inventor has newly focused on a configuration that a master piston may further move forward from a normal use area such that the conventional master cylinder generates an appropriate hydraulic pressure even when fading occurs.

The present invention is achieved in view of the above circumstances, and an object thereof is to provide a braking device for a vehicle capable of making the master cylinder compact.

Solutions to Problems

A braking device for a vehicle according to the present invention is provided with a first hydraulic pressure generation unit including a master cylinder and a master piston that slides in the master cylinder in association with brake operation, the first hydraulic pressure generation unit that generates a hydraulic pressure according to a volume of a master chamber in the master chamber the volume of which changes according to movement of the master piston, a second hydraulic pressure generation unit configured to be able to generate a desired hydraulic pressure in a bottoming state in which forward movement of the master piston is regulated by the master cylinder, a braking force generation unit that applies braking force according to an input hydraulic pressure to a wheel of a vehicle, and a braking force control unit that allows the second hydraulic pressure generation unit to generate the hydraulic pressure to input the generated hydraulic pressure to the braking force generation unit in the bottoming state.

Advantageous Effects of Invention

The conventional master cylinder is formed to have a physical size (volume) capable of coping with large braking force such that the large braking force may be generated when fading occurs. In other words, the conventional master cylinder is configured to allow the master piston to move forward when fading occurs. That is, the conventional master cylinder is formed with the volume larger than the volume (normal use area) used in a normal state other than fading such that bottoming does not occur at the time of fading. Herein, according to the braking device for a vehicle of the present invention, it is possible to generate desired braking force on the wheel of the vehicle in the bottoming state. This eliminates the need for the volume (stroke length) of the master cylinder provided for use at the time of fading, thereby enabling downsizing of the master cylinder.

BRIEF DESCRIPTION OF DRAWINGS

FIG. 1 is a configuration diagram illustrating a configuration of a braking device for a vehicle of a first embodiment.

FIG. 2 is a cross-sectional view illustrating a configuration of a second master chamber of the first embodiment.

FIG. 3 is an illustrative diagram for illustrating change in a master pressure and a wheel pressure with respect to brake operation in bottoming control of the first embodiment.

FIG. 4 is a flowchart for illustrating the bottoming control of the first embodiment.

FIG. 5 is an illustrative diagram for illustrating a volume of a conventional master cylinder.

FIG. 6 is a configuration diagram illustrating a configuration of a brake ECU of a second embodiment.

FIG. 7 is a flowchart for illustrating second bottoming control of the second embodiment.

FIG. 8 is a configuration diagram illustrating a configuration of a modification of this embodiment.

FIG. 9 is a configuration diagram illustrating a configuration of a modification of this embodiment.

FIG. 10 is a configuration diagram illustrating a configuration of a modification of this embodiment.

DESCRIPTION OF EMBODIMENTS

First Embodiment

An embodiment of the present invention is hereinafter described with reference to the drawings. Meanwhile, each of the drawings used for illustrating is a conceptual diagram, and the shape of each part is not necessarily strict in some cases. As illustrated in FIG. 1, a braking device for a vehicle of a first embodiment is provided with a hydraulic pressure generation unit 1, an operation amount detection unit 4, an actuator (corresponding to a "second hydraulic pressure generation unit") 5, and a brake ECU (corresponding to a "braking force control unit") 6.

The hydraulic pressure generation unit 1 is provided with a brake operating member 11, a booster 12, a cylinder mechanism (corresponding to a "first hydraulic pressure generation unit") 13, and wheel cylinders (W/C) (corresponding to "braking force generation units") 14 to 17. The brake operating member 11 of the first embodiment is provided with a brake pedal. The booster 12 is a known device which boosts pedal force applied to the brake operating member 11 by a driver to transmit the boosted pedal force to the cylinder mechanism 13. The booster 12 may be of a hydraulic type (type using a servo pressure) or an electric type, for example. It may be said that the booster 12 is a master piston driving unit which drives master pistons 131 and 132 in accordance with brake operation.

The cylinder mechanism 13 is provided with a master cylinder (M/C) 130, the master pistons 131 and 132, and a reservoir 133. The master pistons 131 and 132 are slidably arranged in the master cylinder 130. The master pistons 131 and 132 partition the inside of the master cylinder 130 into a first master chamber 130a and a second master chamber 130b. The reservoir 133 is a reservoir tank including a pipe line that communicates the first master chamber 130a with the second master chamber 130b. The reservoir 133 and the master chambers 130a and 130b are communicated/blocked by movement of the master pistons 131 and 132.

A peripheral portion of the second master chamber 130b is specifically described. As illustrated in FIG. 2, the master cylinder 130 is provided with a connection port 21 connected to the reservoir 133, seal members 22 and 23, and a connection port 24 connected to the actuator 5. The connection port 21 is a port for communicating the reservoir 133 with the second master chamber 130b. The connection port 21 is arranged between the seal members 22 and 23. In other words, the seal member 22 is arranged on a backward movement side (right side in FIG. 2) of the connection port 21, and the seal member 23 is arranged on a forward movement side (left side in FIG. 2) of the connection port 21. The seal members 22 and 23 being annular rubber members abut an outer peripheral surface of the master piston 132 in a liquid-tight manner. A cross-section in a front-rear direction of each of the seal members 22 and 23 has a convex arc shape (U-shape) convex toward the connection port 21 side. The seal members 22 and 23 of the first embodiment are cup seals. Each of the seal members 22 and 23 block communication between the connection port 21 side (near side) and the side opposite to the connection port 21 (far side) across the same. When pressing force (hydraulic pressure and gravity of the reservoir 133) on the connection port 21 side becomes higher than the pressing force (master pressure) on the side opposite to the connection port 21, the seal members 22 and 23 deform to separate from the master piston 132 by the shapes thereof and allow the communication between the connection port 21 and the second master chamber 130b. A passage 31 is formed on the master piston 132 for communicating an outer peripheral side thereof with an inner peripheral side thereof.

When the master piston 132 is in its initial position, the reservoir 133 and the second master chamber 130b communicate with each other via a flow path (corresponding to a "second flow path") 2A. The flow path 2A is formed of the connection port 21, an inner peripheral surface of the master cylinder 130, an outer peripheral surface of the master piston 132, and the passage 31. On the other hand, when the master piston 132 moves forward and the passage 31 moves to the forward movement side of the seal member 23, the communication between the reservoir 133 and the second master chamber 130b is blocked by the seal member 23. That is, the flow path 2A of brake fluid between the reservoir 133 and the second master chamber 130b is formed so as to be blocked as the master piston 132 moves forward. As is to be described later, the flow path 2A is configured to be openable as the pump 57 operates. The connection port 24 being a port for connecting the second master chamber 130b to the actuator 5 is formed on the forward movement side of the seal member 23 of the master cylinder 130. A connection port and a seal member similar to those of the peripheral portion of the second master chamber 130b are provided also for the first master chamber 130a, but the description thereof is omitted.

The wheel cylinder 14 is arranged on a wheel RL (left rear wheel). The wheel cylinder 15 is arranged on a wheel RR (right rear wheel). The wheel cylinder 16 is arranged on a wheel FL (left front wheel). The wheel cylinder 17 is arranged on a wheel FR (right front wheel). The master cylinder 130 is connected to the wheel cylinders 14 to 17 via the actuator 5. The wheel cylinders 14 to 17 apply braking force corresponding to the input hydraulic pressure to the wheels RL to FR.

In this manner, when the driver steps the brake operating member 11, the pedal force is boosted by the booster 12, and the master pistons 131 and 132 in the master cylinder 130 are pressed. According to this, the same master cylinder pressure (hereinafter referred to as a master pressure) is generated in the first master chamber 130a and the second master chamber 130b. The hydraulic pressure generation unit 1 generates the master pressure according to volumes of the first master chamber 130a and the second master chamber 130b in the first master chamber 130a and the second master chamber 130b whose volumes change according to the movement of the master pistons 131 and 132. The master pressure is transmitted to the wheel cylinders 14 to 17 via the actuator 5.

The operation amount detection unit 4 is provided with a stroke simulator 41, a pressure sensor (corresponding to a "hydraulic pressure detection unit") 42, and a pipe line 4a. The stroke simulator 41 is a device for applying reaction force to the brake operating member 11 in accordance with operation of the brake operating member 11. The stroke simulator 41 is configured such that a simulator piston 412 is slidably fitted to a simulator cylinder 411. The simulator piston 412 is energized forward by a compression spring 413, and a simulator chamber 414 is formed on a front surface side of the simulator piston 412. The reaction force according to the hydraulic pressure in the simulator chamber 414 is applied to the brake operating member 11. The pressure sensor 42 is provided on the pipe line 4a that connects the hydraulic pressure generation unit 1 to the simulator chamber 414 to detect the hydraulic pressure in the simulator chamber 414. The pressure sensor 42 is connected to the brake ECU 6 so as to be able to communicate and transmits a detection result to the brake ECU 6.

The operation amount detection unit 4 is configured so as to be able to detect a brake operation amount even in a bottoming state in which the forward movement of the master pistons 131 and 132 is regulated by the master piston 132. That is, the stroke simulator 41 is configured such that the simulator piston 412 may move forward in accordance with the brake operation amount on the brake operating member 11 even in the bottoming state. In the bottoming state of the first embodiment, the master piston 132 abuts a bottom surface (front end surface) of the master cylinder 130, and the master piston 131 abuts a rear end surface of the master piston 132.

The actuator 5 is a device that controls the hydraulic pressure (hereinafter referred to as a wheel pressure) of the wheel cylinders 14 to 17 in accordance with an instruction from the brake ECU 6. Specifically, the actuator 5 is provided with a hydraulic circuit 5A and a motor 8 as illustrated in FIG. 1. The hydraulic circuit 5A is provided with a first piping system 50a and a second piping system 50b. The first piping system 50a is a system that controls the hydraulic pressure (wheel pressure) applied to the wheels RL and RR. The second piping system 50b is a system that controls the hydraulic pressure (wheel pressure) applied to the wheels FL and FR. Since a basic configuration of the first piping system 50*a* and that of the second piping system 50*b* are similar to each other, the first piping system 50*a* is hereinafter described, and the second piping system 50*b* is not described.

The first piping system 50*a* is provided with a main pipe line (corresponding to "first flow path") A, a differential pressure control valve (corresponding to "solenoid valve") 51, pressure increasing valves 52 and 53, a pressure decreasing pipe line B, pressure decreasing valves 54 and 55, a pressure regulating reservoir 56, a reflux pipe line C, a pump 57, and an auxiliary pipe line D.

The main pipe line A is a flow path arranged between the master cylinder 130 and the wheel cylinders 14 and 15, the pipe line connecting the master cylinder 130 to the wheel cylinders 14 and 15. The differential pressure control valve 51 is a valve provided on the main pipe line A to control the main pipe line A to a communicating state and a differential pressure state. In accordance with the instruction from the brake ECU 6, the differential pressure control valve 51 controls the differential pressure between the master cylinder 130 side on an upstream side thereof and the wheel cylinders 14 and 15 side on a downstream side thereof. In other words, the differential pressure control valve 51 is the solenoid valve configured to be able to control the differential pressure between the hydraulic pressure of the portion on the master cylinder 130 side of the main pipe line A and the hydraulic pressure of the portion on the wheel cylinders 14 and 15 side of the main pipe line A. The differential pressure control valve 51 is put into the communicating state in a non-energized state and is controlled to be in the communicating state in normal brake control except for specific control (automatic brake, anti-skid control, or bottoming control). The differential pressure control valve 51 is set such that, the greater a control current to be applied is, the greater the differential pressure on both sides is.

The differential pressure control valve 51 is provided with a check valve 51*a*. The main pipe line A branches into two pipe lines A1 and A2 on a downstream side of the differential pressure control valve 51 so as to correspond to the wheel cylinders 14 and 15.

The pressure increasing valves 52 and 53 are solenoid valves which are opened and closed according to the instruction from the brake ECU 6, and are normally open valves which are put into an open state (communicating state) in the non-energized state. The pressure increasing valve 52 is arranged on the pipe line A1, and the pressure increasing valve 53 is arranged on the pipe line A2. The pressure decreasing pipe line B connects a portion between the pressure increasing valve 52 and the wheel cylinder 14 on the pipe line A1 and the pressure regulating reservoir 56, and connects a portion between the pressure increasing valve 53 and the wheel cylinder 15 on the pipe line A2 and the pressure regulating reservoir 56. The pressure increasing valves 52 and 53 are mainly energized at the time of pressure decreasing control to be put into a closed state to block the communication between the master cylinder 130 and the wheel cylinders 14 and 15.

The pressure decreasing valves 54 and 55 are solenoid valves which are opened and closed according to the instruction from the brake ECU 6, and are normally closed valves which are put into a closed state (blocked state) in the non-energized state. The pressure decreasing valve 54 is arranged on the pressure decreasing pipe line B on the side of the wheel cylinder 14. The pressure decreasing valve 55 is arranged on the pressure decreasing pipe line B on the side of the wheel cylinder 15. The pressure decreasing valves 54 and 55 are mainly energized to be put into an opened state at the time of pressure decreasing control to communicate the wheel cylinders 14 and 15 with the pressure regulating reservoir 56 via the pressure decreasing pipe line B. The pressure regulating reservoir 56 is a reservoir including a cylinder, a piston, and an energizing member.

The reflux pipe line C is a pipe line that connects the pressure decreasing pipe line B (or the pressure regulating reservoir 56) and a portion between the differential pressure control valve 51 and a portion between the pressure increasing valves 52 and 53 on the main pipe line A. The pump 57 is provided on the reflux pipe line C. The pump 57 is a self-suction pump driven by the motor 8. The pump 57 allows the brake fluid to flow from the pressure regulating reservoir 56 to the master cylinder 130 side or the wheel cylinders 14 and 15 side via the reflux pipe line C. The motor 8 is energized via a relay (not illustrated) to be driven according to the instruction from the brake ECU 6. It may also be said that the pump 57 and the motor 8 serve as one electric pump.

The auxiliary pipe line D is a pipe line that connects the pressure regulating reservoir 56 and a portion (or the master cylinder 130) on an upstream side of the differential pressure control valve 51 on the main pipe line A. Due to drive (operation) of the pump 57, the brake fluid in the master cylinder 130 is discharged to a downstream side of the differential pressure control valve 51 on the main pipe line A, that is, the pipe line on the wheel cylinders 14 and 15 side via the auxiliary pipe line D, the pressure regulating reservoir 56 and the like. In other words, the pump 57 discharges the brake fluid in the second master chamber 130*b* to a portion between the differential pressure control valve 51 and the wheel cylinders 14 and 15 on the main pipe line A in accordance with the drive of the motor 8. According to this, the wheel pressure is increased in specific control such as control (ESC control) as an anti-skid device. The actuator 5 of the first embodiment serves as the anti-skid device (ESC) under the control of the brake ECU 6. The actuator 5 is configured to be able to generate a desired hydraulic pressure in the bottoming state. In a portion between the differential pressure control valve 51 and the master cylinder 130 on the main pipe line A, a pressure sensor Y that detects the hydraulic pressure (master pressure) of the portion is provided. The pressure sensor Y transmits a detection result to the brake ECU 6.

The brake ECU 6 is an electronic control unit provided with a CPU, a memory and the like. The brake ECU 6 receives detection results (detection values) from various sensors and controls the operation of the actuator 5. In addition to the ESC control and ABS control, the brake ECU 6 executes the bottoming control. The brake ECU 6 is provided with a bottoming determination unit 61, a pump control unit 62, an operation amount acquisition unit 63, and a differential pressure setting unit 64 as functions related to the bottoming control. Hereinafter, the bottoming control of the brake ECU 6 is described by taking the first piping system 50*a* as an example.

The bottoming determination unit 61 is a unit that determines whether a status of the cylinder mechanism 13 is the bottoming state. Specifically, the master pressure (detection value of the pressure sensor Y) when bottoming occurs in a state in which the pump 57 does not operate is recorded in advance in the bottoming determination unit 61 as a determination value. The bottoming determination unit 61 compares the determination value with the received detection value of the pressure sensor Y, and determines that the "bottoming state" is established when the detection value is equal to or greater than the determination value.

The pump control unit 62 drives the motor 8 to drive the pump 57 when the bottoming determination unit 61 determines that the bottoming state is established. By the drive of the pump 57, the brake fluid in the second master chamber 130b is discharged to the portion between the differential pressure control valve 51 and the wheel cylinders 14 and 15 on the main pipe line A. The hydraulic pressure (master pressure) of the second master chamber 130b becomes an atmospheric pressure or a negative pressure due to an outflow of the brake fluid. In this manner, by the suction of the pump 57, the seal member 23 is deformed, the flow path 2A is opened, and the reservoir 133 is communicated with the second master chamber 130b. In the first embodiment, by the drive of the pump 57, the brake fluid in the reservoir 133 is discharged to the portion between the differential pressure control valve 51 and the wheel cylinders 14 and 15 on the main pipe line A via the second master chamber 130b. As illustrated in FIG. 3, the master pressure decreases by the drive of the pump 57. An amount corresponding to the operation amount in FIG. 3 relates to the magnitude of the brake operation, and is, for example, the pedal force or a stroke amount.

The operation amount acquisition unit 63 acquires the detection value of the pressure sensor 42, and calculates to acquire the operation amount of the brake operating member 11. The operation amount acquisition unit 63 calculates the operation amount based on the detection value of the pressure sensor 42. The operation amount acquisition unit 63 acquires the operation amount of the brake operating member 11 while the bottoming determination unit 61 determines that the bottoming state is established and transmits the same to the differential pressure setting unit 64. The operation amount acquired by the operation amount acquisition unit 63 is based on a pressure value in the first embodiment, but this may be based on the stroke amount or the pedal force, for example. The differential pressure setting unit 64 sets a differential pressure state of the differential pressure control valve 51 such that the wheel pressure according to target braking force is generated in order to generate the target braking force according to the received operation amount. In accordance with the instruction from the brake ECU 6, the actuator 5 generates a desired differential pressure on both sides of the differential pressure control valve 51 in the bottoming state. According to this, it is possible to exert the wheel pressure according to the brake operation (that is, the braking force) even after the bottoming state is established as illustrated in FIG. 3.

A flow of the bottoming control is described with reference to FIG. 4. The bottoming determination unit 61 determines whether the cylinder mechanism 13 is in the bottoming state (S101). When the cylinder mechanism 13 is in the bottoming state (S101: Yes), the pump control unit 62 operates the pump 57 (S102). Then, the operation amount acquisition unit 63 acquires the operation amount of the brake operating member 11 at the time of bottoming (S103). Then, the differential pressure setting unit 64 sets the differential pressure corresponding to the operation amount acquired by the operation amount acquisition unit 63 to the differential pressure control valve 51 (S104). On the other hand, when the cylinder mechanism 13 is not in the bottoming state (S101: No), the bottoming control ends and the brake control is continued. For example, if no other control is performed, the differential pressure may be set to zero.

According to the braking device for a vehicle of the first embodiment, it is possible to generate the braking force according to the brake operation in the wheels RL to FR in the bottoming state. Therefore, a volume of the master cylinder 130 (area used at the time of fading) for preventing the bottoming at the time of fading becomes unnecessary, and the master cylinder 130 may be made compact. As illustrated in FIG. 5, the conventional master cylinder is formed with a volume larger than the volume required during normal use (other than the time of fading) in order to provide the brake fluid amount necessary at the time of fading to the actuator 5. According to the braking device for a vehicle of the first embodiment, there is no need to provide the area used at the time of fading in FIG. 5, and the volume of the master cylinder 130 may be set to the volume necessary at the time of normal use (normal use area). In this manner, according to the braking device for a vehicle of the first embodiment, it is possible to make the master cylinder 130 compact. The master cylinder is the basic configuration in every brake system, and when this is made compact, mountability to various types of vehicles is greatly improved.

Also, according to the braking device for a vehicle of the first embodiment, when the pump 57 operates in the bottoming state, the brake fluid in the reservoir 133 is sucked into the actuator 5 via the first master chamber 130a and the second master chamber 130b. That is, the reservoir 133 is shared as the reservoir of the cylinder mechanism 13 and the reservoir of the actuator 5. According to this, the configuration of the braking device for a vehicle may be simplified, and an entire braking device for a vehicle may be made compact.

Second Embodiment

In a braking device for a vehicle of a second embodiment, a configuration corresponding to the bottoming determination unit 61 of the braking device for a vehicle of the first embodiment (hereinafter referred to as a "bottoming determination unit 261") and control corresponding to the bottoming control of the braking device for a vehicle of the first embodiment (hereinafter referred to as "second bottoming control") are different from those of the braking device for a vehicle of the first embodiment. As illustrated in FIG. 6, the braking device for a vehicle of the second embodiment is provided with a deceleration slip determination unit 263 that determines whether deceleration slip occurs in a wheel. The braking device for a vehicle of the second embodiment is substantially the same as the braking device for a vehicle of the first embodiment except for the above-described three points. Therefore, in the following description, the same reference sign is assigned to substantially the same configuration as that of the braking device for a vehicle of the first embodiment, and the description thereof is not repeated.

The bottoming determination unit 261 operates a pump 57 before occurrence of a bottoming state, and then determines whether the bottoming state is established based on a master pressure. For example, when the master pressure indicated by a pressure sensor Y is equal to or higher than a predetermined pressure, the bottoming determination unit 261 operates the pump 57 and sets a differential pressure by a differential pressure control valve 51 to a predetermined pressure. Then, the bottoming determination unit 261 determines that the bottoming state is established when a decrease in the master pressure as illustrated in FIG. 3 occurs.

Meanwhile, even if the predetermined pressure is 0 Pa, due to an orifice effect of the differential pressure control valve 51, the differential pressure is generated between a portion on a master cylinder 130 side on a main pipe line A and a portion on wheel cylinders 14 and 15 side on the main pipe line A. If the differential pressure is generated, it is possible to determine whether the bottoming state is established as described above. Therefore, 0 Pa is included in the predetermined pressure.

The deceleration slip determination unit 263 determines whether the deceleration slip occurs in the wheels based on a well-known determination method. For example, the deceleration slip determination unit 263 calculates a slip ratio based on a vehicle body speed and a wheel speed, and determines that the deceleration slip occurs in the wheel when the slip ratio is larger than a predetermined threshold value.

FIG. 7 illustrates a flow of second bottoming control. The deceleration slip determination unit 263 determines whether the deceleration slip occurs in the wheel (S201). When no deceleration slip occurs in the wheel (S201: No), the bottoming determination unit 261 determines whether the bottoming state is established (S202).

When the cylinder mechanism 13 is in the bottoming state (S202: Yes), the pump control unit 62 operates the pump (S203), and a differential pressure setting unit 64 sets the differential pressure of the differential pressure control valve 51 to a predetermined pressure (S204), and when the cylinder mechanism 13 is not in the bottoming state (S202: No), the brake control is continued. For example, when no other control is performed, it may be considered that the differential pressure setting unit 64 sets the differential pressure of the differential pressure control valve 51 to zero.

It is preferable that the predetermined pressure at S204 be set based on a hydraulic pressure at which the deceleration slip occurs in the wheel. Therefore, it may be considered that the predetermined pressure at S204 is variably set based on vehicle information and vehicle exterior information. The vehicle information includes a steering state, a transmission state, an engine state, a wheel state, a vehicle body state and the like. The vehicle exterior state includes a road condition, weather, navigation information and the like. Also, at S204, the differential pressure of the differential pressure control valve 51 set by the differential pressure setting unit 64 may be set so as to be increased according to an elapsed time in the bottoming state in which no deceleration slip occurs in the wheel. On the other hand, when the deceleration slip occurs in the wheel (S201: Yes), the brake ECU 6 executes pressure decreasing control (S205). According to the braking device for a vehicle of the second embodiment, also without a pressure sensor 42 provided, braking force may be generated in wheels RL to FR even in the bottoming state. (Other)

The present invention is not limited to the above-described embodiments. For example, the operation amount detection unit 4 of the first embodiment may also be a pedal force sensor or a stroke sensor. For example, as illustrated in FIG. 8, a stroke sensor (corresponding to a "movement amount detection unit") 43 may be arranged in place of the pressure sensor 42. The stroke sensor 43 is a sensor that detects the stroke amount of the brake operating member 11 (or a rod thereof). The stroke sensor 43 transmits a detection result to the brake ECU 6.

As illustrated in FIG. 9, a stroke simulator 41 may also be incorporated in the cylinder mechanism 13. In this case, a portion corresponding to the simulator cylinder 411 is formed of a rear end portion 411a of the master cylinder 130 and a wall portion 411b provided in the master cylinder 130. A portion corresponding to the simulator piston 412 is formed of a rod 11a assembled to the brake operating member 11. The rod 11a is arranged so as to be slidable with respect to an opening of the rear end portion 411a, and moves forward with brake operation. A compression spring 413a is arranged between the rod 11a and the wall portion 411b. The rear end portion 411a and the wall portion 411b form a simulator chamber 414a. Elastic force of the compression spring 413a (and/or the hydraulic pressure in the simulator chamber 414a) acts as reaction force against forward movement of the rod 11a. The rod 11a may move forward in the bottoming state. In this manner, a configuration that serves as the stroke simulator 41 may also be incorporated in the cylinder mechanism 13. In addition, the stroke sensor 43 may be installed for this braking device for a vehicle. In this manner, the operation amount detection unit 4 may also be formed of the stroke simulator 41 and the stroke sensor 43.

As illustrated in FIG. 10, the operation amount detection unit 4 may also be formed of a pedal force sensor 44. The pedal force sensor 44 detects the pedal force applied to the brake operating member 11 and transmits the same to the brake ECU 6. Meanwhile, in the cylinder mechanism 13 in FIG. 10, the rod 11a is connected to the master piston 131. In this manner, the operation amount detection unit 4 may be provided with at least one of the pressure sensor 42, the stroke sensor 43, and the pedal force sensor 44. The operation amount acquisition unit 63 may acquire the operation amount based on the pressure value, the stroke amount, and/or the pedal force. Meanwhile, FIGS. 8 to 10 are conceptual diagrams illustrating an arrangement configuration of the cylinder mechanism 13 in a simplified manner.

Also, the bottoming state may be determined by the bottoming determination unit 61 of the first embodiment by using the hydraulic pressure in the simulator chamber 414 (detection value of the pressure sensor 42), the detection value of the stroke sensor 43, and/or the detection value of the pedal force sensor 44. For example, the bottoming determination unit 61 may determine the bottoming state by using the sensor detection value at the time of bottoming simulated in advance (the detection value of the pressure sensor 42, the detection value of the stroke sensor 43, and/or the detection value of the pedal force sensor 44) as a determination value. Also, regardless of the presence or absence of the booster 12, an arrangement configuration of the booster 12, and a method of driving the master pistons 131 and 132 by the booster 12, the present invention is applicable to the braking device for a vehicle including the cylinder mechanism 13.

Also, the pressure decreasing control (S205) of the second embodiment may be a part of the ABS control. That is, when the deceleration slip determination unit 263 determines that the deceleration slip occurs in the wheel, a mode of the braking control is shifted to the ABS control.

SUMMARY

A braking device for a vehicle of this embodiment is provided with a first hydraulic pressure generation unit 13 including a master cylinder 130 and master pistons 131 and 132 that slide in the master cylinder 130 in association with brake operation, the first hydraulic pressure generation unit 13 that generates a hydraulic pressure according to volumes of master chambers 130a and 130b in the master chambers 130a and 130b the volumes of which change according to movement of the master pistons 131 and 132, a second hydraulic pressure generation unit 5 configured to be able to generate a desired hydraulic pressure in a bottoming state in which forward movement of the master pistons 131 and 132 is regulated by the master cylinder 130, braking force generation units 14 to 17 that apply braking force according to an input hydraulic pressure to wheels RL to FL of a vehicle, and a braking force control unit 6 that allows the second hydraulic pressure generation unit 5 to generate the hydraulic pressure to input the generated hydraulic pressure to the braking force generation units 14 to 17 in the bottoming state.

The braking device for a vehicle is provided with bottoming determination units 61 and 261 that determine that the bottoming state is established and a deceleration slip determination unit 263 that determines that deceleration slip occurs in the wheel, and the braking force control unit 6 may allow the second hydraulic pressure generation unit 5 to generate the hydraulic pressure until the deceleration slip occurs in the wheel when the bottoming determination units 61 and 261 determine that the bottoming state is established.

The braking device for a vehicle is provided with an operation amount detection unit 4 configured to be able to detect a brake operation amount in the bottoming state, and the braking force control unit 6 may allow the second hydraulic pressure generation unit 5 to generate the hydraulic pressure according to the brake operation amount detected by the operation amount detection unit 4 in the bottoming state.

The second hydraulic pressure generation unit 5 includes a solenoid valve 51 provided on a first flow path A of brake fluid between the first hydraulic pressure generation unit 13 and the braking force generation units 14 to 17, the solenoid valve 51 configured to be able to control a difference pressure between the hydraulic pressure of a portion on the first hydraulic pressure generation unit 13 side of the first flow path A and the hydraulic pressure of a portion on the braking force generation units 14 to 17 side of the first flow path A, and a pump 57 that discharges the brake fluid in the master chambers 130a and 130b to a portion between the solenoid valve 51 and the braking force generation units 14 to 17 on the first flow path A and may generate the differential pressure by the solenoid valve 51 while discharging the brake fluid in the master chambers 130a and 130b to a portion between the solenoid valve 51 and the braking force generation units 14 to 17 on the first flow path A by the pump 57 in order to generate a desired fluid pressure. In this case, the first hydraulic pressure generation unit 13 includes a reservoir 133 in which the brake fluid is accumulated, the second flow path 2A of the brake fluid between the reservoir 133 and the master chambers 130a and 130b is configured to be blockable in association with forward movement of the master pistons 131 and 132, and the second flow path 2A may be configured to be openable in association with the operation of the pump 57 in the bottoming state.

The braking device for a vehicle is provided with the bottoming determination unit 261 that determines that the bottoming state is established when the hydraulic pressure in the master chambers 130a and 130b is equal to or lower than a predetermined hydraulic pressure in a state in which the pump 57 is operated and the differential pressure is generated, and the braking force control unit 6 may allow the second hydraulic pressure generation unit 5 to generate the braking force when the bottoming determination unit 261 determines that the bottoming state is established.

The operation amount detection unit 4 includes a simulator cylinder 411 (411a and 411b), a simulator piston 412 (11a) that slides in the simulator cylinder 411 (411a and 411b) in association with the brake operation, and a movement amount detection unit 43 that detects a movement amount of the simulator piston 412 (11a), and the simulator piston 412 (11a) may be configured to be movable in the bottoming state.

The operation amount detection unit 4 includes the simulator cylinder 411 (411a and 411b), the simulator piston 412 (11a) that slides in the simulator cylinder 411 (411a and 411b) in association with the brake operation, and a hydraulic pressure detection unit 42 that detects the hydraulic pressure in the simulator chamber 414 (414a) a volume of which changes in accordance with the movement of the simulator piston 412 (11a), and the simulator piston 412 (11a) may be configured to be movable in the bottoming state. The first embodiment and the second embodiment may be combined with each other.

The invention claimed is:

1. A braking device for a vehicle comprising:
   a first hydraulic pressure generation unit including a master cylinder and a master piston that slides in the master cylinder in association with brake operation, the first hydraulic pressure generation unit that generates a hydraulic pressure according to a volume of a master chamber in the master chamber the volume of which changes according to movement of the master piston;
   a second hydraulic pressure generation unit configured to generate a desired hydraulic pressure in a bottoming state in which forward movement of the master piston is regulated by the master cylinder, the desired hydraulic pressure being a hydraulic pressure at which deceleration slip is expected to occur in a wheel of the vehicle;
   a braking force generation unit that applies braking force according to an input hydraulic pressure to the wheel of a vehicle;
   a braking force control unit that determines the desired hydraulic pressure based on at least one of vehicle information or vehicle exterior information and allows the second hydraulic pressure generation unit to generate the desired hydraulic pressure to input the generated hydraulic pressure to the braking force generation unit in the bottoming state;
   a bottoming determination unit that determines that the bottoming state is established; and
   a deceleration slip determination unit that determines that deceleration slip occurs in the wheel,
   wherein the braking force control unit allows the second hydraulic pressure generation unit to generate the desired hydraulic pressure until the deceleration slip occurs in the wheel when the bottoming determination unit determines that the bottoming state is established.

2. The braking device for a vehicle according to claim 1, comprising
   an operation amount detection unit configured to be able to detect a brake operation amount in the bottoming state,
   wherein the braking force control unit allows the second hydraulic pressure generation unit to generate the hydraulic pressure according to the brake operation amount detected by the operation amount detection unit in the bottoming state.

3. The braking device for a vehicle according to claim 1, wherein the second hydraulic pressure generation unit includes
   a solenoid valve provided on a first flow path of brake fluid between the first hydraulic pressure generation unit and the braking force generation unit, the solenoid valve configured to be able to control a differential pressure between the hydraulic pressure of a portion on a side of the first hydraulic pressure generation unit of the first flow path and the hydraulic pressure of a portion on a side of the braking force generation unit of the first flow path, and a pump that discharges the brake fluid in the master chamber to a portion between the solenoid valve and the braking force generation unit of the first flow path, and generates the differential pressure by the solenoid valve while discharging the brake fluid in the master chamber to the portion between the solenoid valve and the braking force generation unit of the first flow path by the pump so as to generate the desired hydraulic pressure, and the first hydraulic pressure generation unit includes a reservoir in which the brake fluid is accumulated, a second flow path of the brake fluid between the reservoir and the master chamber being configured to be blockable in association with the forward movement of the master piston, and the second flow path being configured to be openable in association with operation of the pump in the bottoming state.

4. The braking device for a vehicle according to claim 3, wherein the bottoming determination unit that determines the bottoming state is established when the hydraulic pressure in the master chamber is equal to or lower than a predetermined hydraulic pressure in a state in which the pump is operated and the differential pressure is generated, and the braking force control unit allows the second hydraulic pressure generation unit to generate braking force when the bottoming determination unit determines that the bottoming state is established.

5. The braking device for a vehicle according to claim 2, wherein the operation amount detection unit includes a simulator cylinder, a simulator piston that slides in the simulator cylinder in association with the brake operation, and a movement amount detection unit that detects a movement amount of the simulator piston, the simulator piston being configured to be movable in the bottoming state.

6. The braking device for a vehicle according to claim 2, wherein the operation amount detection unit includes the simulator cylinder, the simulator piston that slides in the simulator cylinder in association with the brake operation, and a hydraulic pressure detection unit that detects the hydraulic pressure in a simulator chamber a volume of which changes in association with the movement of the simulator piston, the simulator piston being configured to be movable in the bottoming state.

7. A braking device for a vehicle comprising:
a first hydraulic pressure generation unit including a master cylinder and a master piston that slides in the master cylinder in association with brake operation, the first hydraulic pressure generation unit that generates a hydraulic pressure according to a volume of a master chamber in the master chamber the volume of which changes according to movement of the master piston;
a second hydraulic pressure generation unit configured to be able to generate a desired hydraulic pressure in a bottoming state in which forward movement of the master piston is regulated by the master cylinder;
a braking force generation unit that applies braking force according to an input hydraulic pressure to a wheel of a vehicle;
a braking force control unit that allows the second hydraulic pressure generation unit to generate the hydraulic pressure to input the generated hydraulic pressure to the braking force generation unit in the bottoming state;
a bottoming determination unit that determines that the bottoming state is established;
a deceleration slip determination unit that determines that deceleration slip occurs in the wheel; and
an operation amount detection unit configured to be able to detect a brake operation amount in the bottoming state,
wherein the braking force control unit allows the second hydraulic pressure generation unit to generate the hydraulic pressure until the deceleration slip occurs in the wheel when the bottoming determination unit determines that the bottoming state is established, and to generate the hydraulic pressure according to the brake operation amount detected by the operation amount detection unit in the bottoming state.

8. The braking device for a vehicle according to claim 7, wherein the operation amount detection unit includes a simulator cylinder, a simulator piston that slides in the simulator cylinder in association with the brake operation, and a movement amount detection unit that detects a movement amount of the simulator piston, the simulator piston being configured to be movable in the bottoming state.

9. The braking device for a vehicle according to claim 7, wherein the operation amount detection unit includes the simulator cylinder, the simulator piston that slides in the simulator cylinder in association with the brake operation, and a hydraulic pressure detection unit that detects the hydraulic pressure in a simulator chamber a volume of which changes in association with the movement of the simulator piston, the simulator piston being configured to be movable in the bottoming state.

10. A braking device for a vehicle comprising:
a first hydraulic pressure generation unit including a master cylinder and a master piston that slides in the master cylinder in association with brake operation, the first hydraulic pressure generation unit that generates a hydraulic pressure according to a volume of a master chamber in the master chamber the volume of which changes according to movement of the master piston;
a second hydraulic pressure generation unit configured to be able to generate a desired hydraulic pressure in a bottoming state in which forward movement of the master piston is regulated by the master cylinder;
a braking force generation unit that applies braking force according to an input hydraulic pressure to a wheel of a vehicle;
a braking force control unit that allows the second hydraulic pressure generation unit to generate the hydraulic pressure to input the generated hydraulic pressure to the braking force generation unit in the bottoming state;
a bottoming determination unit that determines that the bottoming state is established; and
a deceleration slip determination unit that determines that deceleration slip occurs in the wheel,
wherein the braking force control unit allows the second hydraulic pressure generation unit to generate the hydraulic pressure until the deceleration slip occurs in the wheel when the bottoming determination unit determines that the bottoming state is established,
wherein the second hydraulic pressure generation unit includes
a solenoid valve provided on a first flow path of brake fluid between the first hydraulic pressure generation unit and the braking force generation unit, the solenoid valve configured to be able to control a differential pressure between the hydraulic pressure of a portion on a side of the first hydraulic pressure generation unit of the first flow path and the hydraulic pressure of a portion on a side of the braking force generation unit of the first flow path, and a pump that discharges the brake fluid in the master chamber to a portion between the solenoid valve and the braking force generation unit of the first flow path, and generates the differential pressure by the solenoid valve while discharging the brake fluid in the master chamber to the portion between the solenoid valve and the braking force generation unit of the first flow path by the pump so as to generate the desired hydraulic pressure, and the first hydraulic pressure generation unit includes a reservoir in which the brake fluid is accumulated, a second flow path of the brake fluid between the reservoir and the master chamber being configured to be blockable in association with the forward movement of the master piston, and the second flow path being configured to be openable in association with operation of the pump in the bottoming state.

11. The braking device for a vehicle according to claim 10, wherein the bottoming determination unit determines that the bottoming state is established when the hydraulic pressure in the master chamber is equal to or lower than a predetermined hydraulic pressure in a state in which the pump is operated and the differential pressure is generated, and the braking force control unit allows the second hydraulic pressure generation unit to generate braking force when the bottoming determination unit determines that the bottoming state is established.

\* \* \* \* \*